United States Patent
Wang

(10) Patent No.: US 9,946,965 B2
(45) Date of Patent: Apr. 17, 2018

(54) ENCODING METHOD AND DECODING METHOD FOR TWO-DIMENSIONAL BARCODE AND ELECTRONIC DEVICE

(71) Applicant: Shuo-Teng Wang, New Taipei (TW)

(72) Inventor: Shuo-Teng Wang, New Taipei (TW)

( * ) Notice: Subject to any disclaimer, the term of this patent is extended or adjusted under 35 U.S.C. 154(b) by 0 days.

(21) Appl. No.: 15/356,390

(22) Filed: Nov. 18, 2016

(65) Prior Publication Data

US 2017/0147914 A1    May 25, 2017

(30) Foreign Application Priority Data

Nov. 20, 2015   (TW) .............................. 104138485 A

(51) Int. Cl.

| | |
|---|---|
| *G06K 19/06* | (2006.01) |
| *G06F 21/60* | (2013.01) |
| *G06F 21/36* | (2013.01) |
| *H04L 29/06* | (2006.01) |
| *H04W 4/00* | (2018.01) |
| *H04W 12/02* | (2009.01) |

(52) U.S. Cl.
CPC ....... *G06K 19/06056* (2013.01); *G06F 21/36* (2013.01); *G06F 21/602* (2013.01); *G06K 19/06037* (2013.01); *G06K 19/06112* (2013.01); *H04L 63/0442* (2013.01); *H04W 4/008* (2013.01); *G06F 2221/2107* (2013.01); *H04W 12/02* (2013.01)

(58) Field of Classification Search
CPC ............ G06F 21/602; G06K 19/06037; G06K 19/06056; G06K 19/06112; G06K 7/1095; G06K 7/1413; G06K 7/1417
USPC .......................................................... 235/494
See application file for complete search history.

(56) References Cited

U.S. PATENT DOCUMENTS

| | | | | |
|---|---|---|---|---|
| 9,213,931 | B1 * | 12/2015 | Annan ................... | G06K 19/06 |
| 2010/0116888 | A1 * | 5/2010 | Asami ................ | G06K 7/10722 |
| | | | | 235/454 |

(Continued)

OTHER PUBLICATIONS

Definition of "Literal", Merriam-Webster Dictionary, retrieved on Aug. 22, 2017 from www.merriam-webster.com/dictionary/literal.*

(Continued)

*Primary Examiner* — Claude J Brown
(74) *Attorney, Agent, or Firm* — Li & Cai Intellectual Property (USA) Office

(57) ABSTRACT

Disclosed are encoding and decoding methods for 2D barcodes, and an electronic device. During the encoding, the electronic device obtains a 1D barcode, captures a horizontal image of the 1D barcode, and encodes the horizontal image, with/without a literal data, a numerical data or a combination thereof into a 2D barcode. During the decoding, the electronic device obtains the 2D barcode, and decodes the 2D barcode into a 1D barcode with/without a literal data, a numerical data or a combination thereof. Thus, more data can be written in the 2D barcode but an image data of the 2D barcode will not be too large. The electronic device can quickly transmit the 2D barcode to another electronic device without any optical device to capture the 2D barcode for decoding it into a 1D barcode with/without a literal data, a numerical data or a combination thereof.

19 Claims, 10 Drawing Sheets

(56) References Cited

U.S. PATENT DOCUMENTS

| | | | | |
|---|---|---|---|---|
| 2012/0029994 | A1* | 2/2012 | Barkan | G06Q 30/0207 |
| | | | | 705/14.25 |
| 2013/0161398 | A1* | 6/2013 | Silver | G06K 7/1413 |
| | | | | 235/462.25 |
| 2015/0349966 | A1* | 12/2015 | Dimitrakos | H04L 9/3271 |
| | | | | 713/168 |
| 2015/0371128 | A1* | 12/2015 | Osborne | G06K 19/06112 |
| | | | | 235/462.01 |

OTHER PUBLICATIONS

Lin, Pei-Yu et al., "QR Code Steganography with Secret Payload Enhancement", IEEE Journal, Sep. 26, 2016.*

Chen, Wen-Yuan et al., "Nested Image Steganography Scheme Using QR-Barcode Technique", Optical Engineering, vol. 48, No. 5, May 2009.*

* cited by examiner

ENCODING METHOD AND DECODING METHOD FOR TWO-DIMENSIONAL BARCODE AND ELECTRONIC DEVICE

BACKGROUND OF THE INVENTION

1. Field of the Invention

The instant disclosure relates to an encoding method and a decoding method for two-dimensional (2D) barcodes and an electronic device; in particular, to an encoding method that encodes at least one one-dimensional (1D) barcode into a 2D barcode, a corresponding decoding method, and an electronic device to execute the methods.

2. Description of Related Art

The one-dimensional (1D) barcode is an optical, machine-readable, representation of data by varying the widths and spaces of parallel lines, and can be read quickly by a scanner. The 1D barcode has a high reliability, and is commonly used for data identification. The commonly used 1D barcodes are, for example, Code 39, Code 128, Code 11, Code 25, UPC-A, UPC-E, EAN-13, EAN-8, Code-B, CodaBar, ITF, Matrix 25, MSI, ISBN, ISSN and the like. However, the amount of information fit into a 1D barcode usually needs to be less than fifteen characters. Thus, the 1D barcode has a limited capability to have data written in, and if a user wants more details about the information indicated by the 1D barcode, he/she needs to find them in some database through the Internet.

The two-dimensional (2D) barcode is another type of machine-readable optical barcode, which is usually used to display text to the user, to open a Uniform Resource Identifier (URI) for linking a website and/or downloading digital contents, making item identification and commercial trade. The 2D barcodes are, for example, QR code, PDF 471, Data Matrix and the like. Compared with the 1D barcode, the 2D barcode can carry more data but still has its limitations. For the QR code, it can have at most 7,089 characters for numbers, at most 4,296 characters for alphanumeric, or at most 2,953 bytes for binary numbers, but excluding images. Moreover, if the 2D barcode has more data, its file size will increase, which makes it hard to be recognized in an optical way. Furthermore, a common decoding process for a 2D barcode must comprise: 1) adjusting the focus to capture a 2D barcode by an optical device, such as a CCD or a CMOS; 2) recognizing the 2D barcode by a recognition program; and 3) decoding the 2D barcode to generate a result.

From the above, how to make a 2D barcode carry more data types, e.g. 1D barcode image, without being hard to recognize and being a huge file for transmitting, is significant. Additionally, if there is no optical device needed for adjusting the focus to capture a 2D barcode, the decoding will take less time.

SUMMARY OF THE INVENTION

The instant disclosure provides an encoding method for 2D barcodes. This encoding method is used in an electronic device to encode a feature of a 1D barcode into the 2D barcode. The 1D barcode comprises a plurality of parallel black bars and white bars. This encoding method comprises: obtaining the 1D barcode; capturing a horizontal image of the 1D barcode near a horizontal midline of the 1D barcode, wherein the horizontal image refers as a feature of the 1D barcode and comprises part of each black bar and part of each white bar; compressing the horizontal image to generate a steganographic data (hereinafter, stego-data); and encoding the stego-data into the 2D barcode.

The instant disclosure further provides an electronic device. This electronic device is used to encode a feature of a 1D barcode into a 2D barcode. The 1D barcode comprises a plurality of parallel black bars and white bars. This electronic device comprises a storage unit and an operation processing unit. The operation processing unit is electrically connected to the storage unit to execute steps: obtaining the 1D barcode; capturing a horizontal image of the 1D barcode near a horizontal midline of the 1D barcode, wherein the horizontal image refers as a feature of the 1D barcode and comprises part of each black bar and part of each white bar; compressing the horizontal image to generate a stego-data; encoding the stego-data into the 2D barcode; and storing the 2D barcode in the storage unit.

The instant disclosure also provides a decoding method for 2D barcodes. This decoding method is used in an electronic device to obtain a feature of a 1D barcode from the 2D barcode. The 1D barcode comprises a plurality of parallel black bars and white bars. This decoding method comprises: obtaining the 2D barcode; decoding the 2D barcode and generating a stego-data, wherein the stego-data comprises a feature, the feature is related to a horizontal image, the horizontal image is captured near a horizontal midline of the 1D barcode, and the horizontal image comprises part of each black bar and part of each white bar; decompressing the stego-data to generate the horizontal image of the 1D barcode; and vertically enlarging the height of the horizontal image to a predetermined bar height and generating the 1D barcode.

To sum up, by using the encoding method and the decoding method for 2D barcodes, and the electronic device executing these methods provided by the instant disclosure, a feature of a 1D barcode, such as a horizontal image of the 1D barcode, is compressed and encoded into a 2D barcode. In addition to the feature of the 1D barcode, a literal data, a numerical data or both can be also encoded into the 2D barcode. In this manner, the image data of the 2D barcode will not only have a greater capacity to carry more data types, but also will not be increased too greatly to recognize when using optical devices, and even more there is no optical device needed for adjusting the focus to capture and then to decode the 2D barcode. Moreover, the image data of the 2D barcode will not increase too much, so the 2D barcode can be transmitted from one electronic device to another electronic device quickly to decode the 2D barcode into at least one 1D barcode, and a literal data, a numerical data or both.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

An encoding method, a decoding method for 2D barcodes and an electronic device executing these methods are disclosed in the instant disclosure. During the encoding, the electronic device obtains a one-dimensional (1D) barcode. After that, the electronic device captures a horizontal image of the 1D barcode near a horizontal midline of the 1D barcode, and the horizontal image is referred as the feature of the 1D barcode. Finally, the electronic device compresses the feature of the 1D barcode and generates a steganographic data (i.e. stego-data), and encodes the stego-data with/without the literal data, the numerical data or both into a two-dimensional (2D) barcode, wherein the stego-data can be further encrypted to an encrypted data. During decoding, the electronic device decodes the 2D barcode into the stego-data with/without the literal data, the numerical data or both. After that, the electronic device decompresses the stego-data and generates a feature; the feature is related to a horizontal image of a 1D barcode. However, it is worth mentioning that, if the stego-data has been encrypted, the electronic device must decrypt the stego-data before decompressing. Finally, the electronic device vertically enlarges the height of the horizontal image to a predetermined bar height and generates the 1D barcode. In this manner, the image data of a 2D barcode will not be large and the 2D barcode can still be well recognized by using optical devices. In addition, many 1D barcode images can be carried into a 2D barcode by using the feature of the 1D barcode, and more information can be provided, even more there is no optical device needed for adjusting the focus to capture and then to decode the 2D barcode. Moreover, the image data of a 2D barcode is small so that one electronic device can quickly transmit the image data of the 2D barcode to another electronic device, then to generate the wanted 1D barcode images and more information. The following description is to further illustrate the encoding method, the decoding method and the electronic device executing these two methods for 2D barcodes in this disclosure.

Figure 1A:
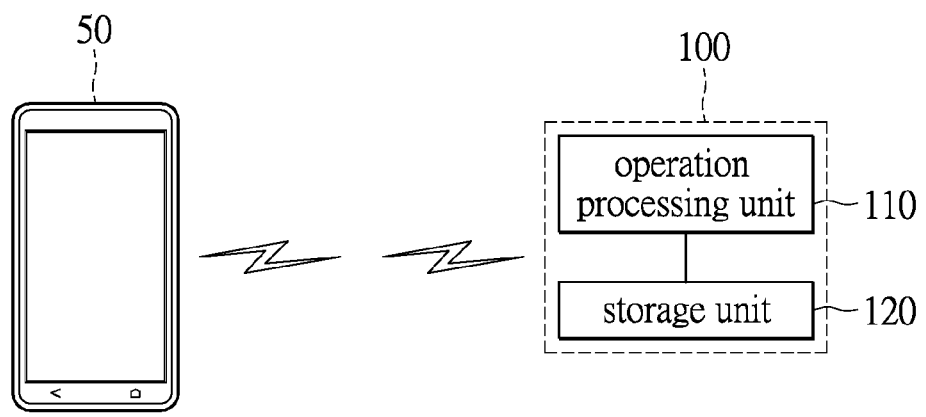
FIG. 1A shows a schematic diagram of an electronic device encoding and decoding 2D bar codes of one embodiment of the instant disclosure.

Referring to FIG. 1A, FIG. 1A shows a schematic diagram of an electronic device encoding and decoding 2D bar codes of one embodiment of the instant disclosure. As shown in FIG. 1A, an electronic device 100 is used to encode at least one feature of a 1D barcode into a 2D barcode. The 1D barcode comprises a plurality of black bars and a plurality of white bars. The black bars and the white bars are parallel and have different widths according to different coding rules of the 1D barcode. The electronic device 100 encodes the feature related to the 1D barcode and the width relationship of the black bars and the white bars of the 1D barcode into the 2D barcode.

Figure 1B:
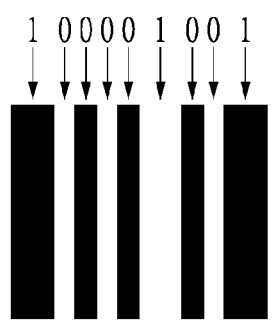
FIG. 1B shows a schematic diagram of a Code 39 barcode of one embodiment of the instant disclosure.

Referring to FIG. 1B, a Code 39 barcode is taken as an example of the 1D barcode. One character is composed of nine bars including five black bars and four white bars. Among these 9 bars, there are three thick bars and six thin bars. The thick bars can be represented by "1", and the thin bars can be represented by "0". The 1D barcode shown in FIG. 1B indicates the character "A", wherein the black bars are represented by "10001" and the white bars are represented by "0010". The encoding rules for the Code 39 barcode are understood by those skilled in the art. In this embodiment, the electronic device 100 can be a server having transmission function, such as a host at a base station, a machine like a Point of Sale (POS) or a KIOSK, a mobile device like a mobile phone, a tablet or a wearable device, or any combination thereof, and it is not limited herein.

Figure 2:
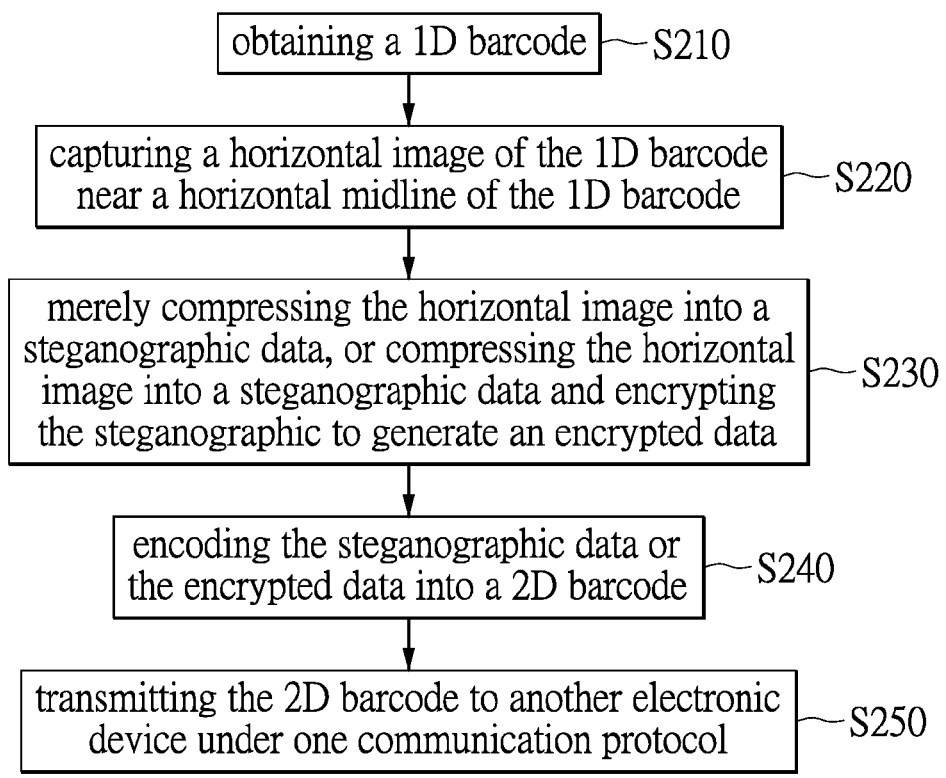
FIG. 2 shows a flow chart of an encoding method for 2D barcodes of one embodiment of the instant disclosure.
Figure 3:
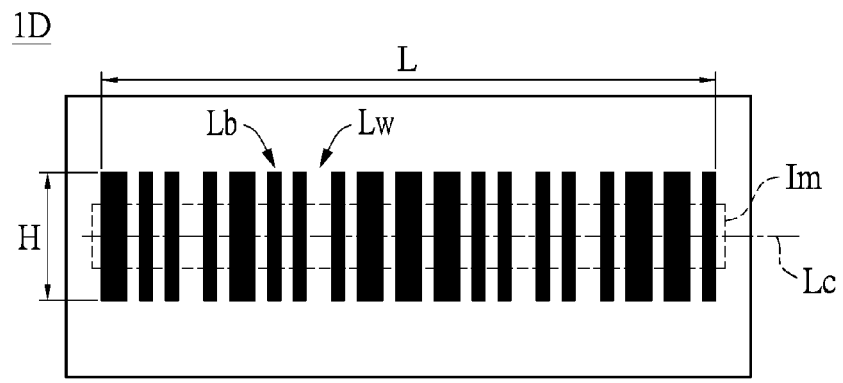
FIG. 3 shows a schematic diagram of a 1D barcode of one embodiment of the instant disclosure.

The electronic device 100 comprises an operation processing unit 110 and a storage unit 120. In this embodiment, a 1D barcode can be previously stored in the storage unit 120 or can be transmitted from an external device to the electronic device 100, and it is not limited herein. The operation processing unit 110 is electrically connected to the storage unit 120 to encode the information of the width relationship of the black bars and the white bars of the 1D barcode into a 2D barcode. Referring to FIG. 2 and FIG. 3, FIG. 2 shows a flow chart of an encoding method for 2D barcodes of one embodiment of the instant disclosure, and FIG. 3 shows a schematic diagram of a 1D barcode of one embodiment of the instant disclosure.

First, in step S210, the operation processing unit 110 obtains a 1D barcode. In this embodiment, the operation processing unit 110 obtains a 1D barcode from an external device, but in other embodiments the operation processing unit 110 can also obtain a 1D barcode that is stored in its storage unit 120. As shown in FIG. 3, there is a certain ratio of the length L and the height H of the 1D barcode. FIG. 3 is only for showing the width relationship of black bars Lb and white bars Lw of a 1D barcode, but not for restricting the instant disclosure.

After that, in step S220, the operation processing unit 110 captures a horizontal image Im of the 1D barcode near a horizontal midline Lc of the 1D barcode. The horizontal image Im comprises part of each black bar Lb and part of each white bar Lw. Specifically speaking, the 1D barcode is composed of many parallel black bars Lb and white bars Lw, so the horizontal image Im can be referred to as a feature of the 1D barcode. According to the horizontal image Im, the operation processing unit 110 can obtain the width relationship of black bars Lb and white bars Lw, and thus the operation processing unit 110 can obtain the image data of the 1D barcode after decoding a 2D barcode.

In step S230, the operation processing unit 110 compresses the horizontal image Im and generates a stego-data in order to make the image data of the horizontal image Im smaller. In this embodiment, the horizontal image Im is compressed into a stego-data by using run-length encoding (RLE) to prevent a distortion of the compressed horizontal image Im. Details about the RLE are easily understood by those skilled in the art. In other embodiments, the horizontal image Im can be compressed into a stego-data by using other compression methods, such as Huffman compression, Flate/deflate compression, LZW compression, which are less likely to damage the data, or such as JPEG compression which may damage the data, and it is not limited herein.

In addition, in step S230, the stego-data can be encrypted by using an RSA algorithm in order to accordingly generate an encrypted data to protect the stego-data from easy decoding by people having bad intention. The RSA algorithm is one of the common encryption algorithms, so it is easily understood by those skilled in the art. In other embodiments, the stego-data can be encrypted by using other encryption algorithms, and it is not limited herein.

In step S240, the operation processing unit 110 encodes the stego-data into a 2D barcode. The stego-data includes a start flag and an end flag. According to the start and the end flags, the operation processing unit 110 can encode the stego-data into a 2D barcode by using a two-dimensional array and a 2D barcode encoding algorithm, and generate image data of the 2D barcode. The two-dimensional array and the 2D barcode encoding algorithm are commonly used data type and encoding algorithm easily understood by those skilled in the art. In other embodiments, the operation processing unit 110 can encode the stego-data into a 2D barcode by using other data types and encoding algorithms, and it is not limited herein.

For example, the 1D barcode is a barcode of an invoice, and the encrypted data is a compressed and encrypted horizontal image Im of the barcode of the invoice. In this example, the operation processing unit 110 encodes encrypted data into a 2D barcode d1 as shown in FIG. 4A.

Figure 4A:
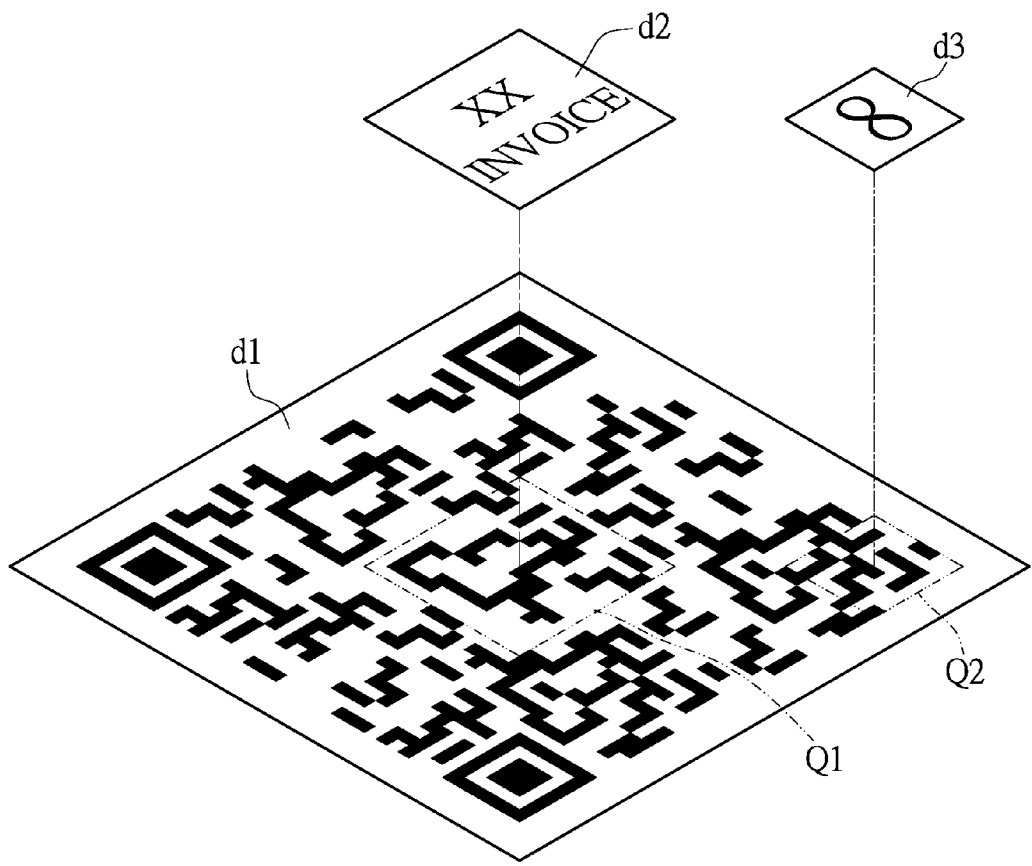
FIG. 4A shows an exploded view showing identifiable images composed upon a 2D barcode of one embodiment of the instant disclosure.

After step S240, the operation processing unit 110 can compose at least one identifiable image at one position of the 2D barcode like the 2D barcode d1 shown in FIG. 4A, to make a user easily know what this 2D barcode can be used for or what kind of visible information he/she may directly obtain from this 2D barcode exterior. However, it is worth mentioning that, the identifiable image is usually considered as an allowed error correction of the 2D barcode. Thus, the ratio of the identifiable image and the entire 2D barcode image needs to be under a predetermined ratio (i.e. the error correction level of the 2D barcode); otherwise the correct encrypted data cannot be obtained by decoding the 2D barcode. Preferably, the predetermined ratio is 30%. In this case, the correct encrypted data can be obtained by decoding the 2D barcode as long as the identifiable images are smaller than 30% of the entire 2D barcode.

In other embodiments, the operation processing unit 110 obtains a literal data, a numerical data or a combination thereof and accordingly generates a plaintext data. Further, the operation processing unit 110 encodes the stego-data and the plaintext data into a 2D barcode. The stego-data, the literal data, and the numerical data respectively comprise a start flag and an end flag. Therefore, the operation processing unit 110 uses a two-dimensional array and a 2D barcode encoding algorithm to encode the stego-data and the plaintext data into a 2D barcode according to the start and the end flags. The two-dimensional array and a 2D barcode encoding algorithm are commonly used data type and encoding algorithm which easily understood by those skilled in the art. In other embodiments, the stego-data and the plaintext data can be adapted to other data types and encoding algorithms, and it is not limited herein.

As mentioned, the 1D barcode can be, for example, a barcode of an invoice, and the encrypted data is a compressed and encrypted horizontal image Im of the barcode of the invoice. The plaintext data may include the literal data "August" and the numerical data "12345678", which are the month information and the invoice number of the invoice. In this example, the operation processing unit 110 encodes the compressed and encrypted horizontal image Im (that is, the encrypted data), the literal data "August" and the numerical data "12345678" (that is, the plaintext data) into a 2D barcode (that is, image d1 of FIG. 4A).

Figure 4B:
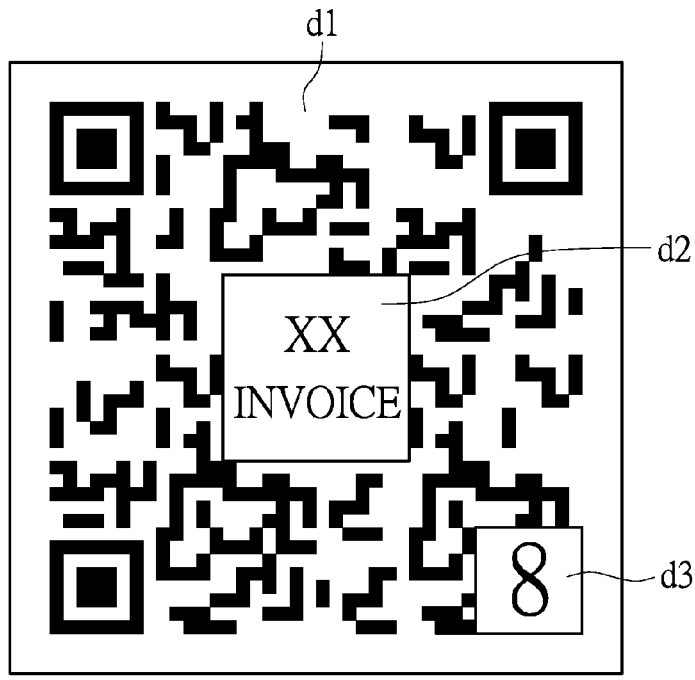
FIG. 4B shows a schematic diagram showing identifiable images composed upon a 2D barcode of one embodiment of the instant disclosure.

Referring to FIG. 4A and FIG. 4B, they show an exploded view and a schematic diagram showing identifiable images that is composed upon a 2D barcode image of one embodiment of the instant disclosure. The 2D barcode image d1 comprises contents including the compressed horizontal image Im, the literal data "August", the numerical data "12345678 and the like. An identifiable image d2 shows "INVOICE" and an identifiable image d3 shows "8". The operation processing unit 110 can respectively compose the identifiable image d2 "INVOICE" and the identifiable image d3 "8" upon positions Q1 and Q2 shown in FIG. 4A, such that a user can see the images "INVOICE" and "8" on the 2D barcode exterior. Details about how to compose identifiable images upon the 2D barcode are easily understood by the skilled in the art. In this embodiment, the identifiable images can be composed upon the 2D barcode by using any image composition algorithm, and it is not limited herein.

Again referring to FIG. 1A, in step S250, after generating a 2D barcode, the operation processing unit 110 transmits the 2D barcode to another electronic device 50 under one communication protocol. When a user sees the 2D barcode on an electronic device 50, he/she also sees the images "INVOICE" and "8" that are composed on the 2D barcode. Thus, the user can know that this 2D barcode indicates an invoice of August. Further, the user can use the electronic device 50 to decode the 2D barcode and obtain the image of the 1D barcode, the literal data "August" and the numerical data "12345678". In this embodiment, the electronic device 50 can be a device having a telecommunication module or a network communication module, such as a smart phone, a tablet, a wearable device, a POS machine, a KIOSK machine or the like, and it is not limited herein.

The above telecommunication module and network communication module can use, for example, Asymmetric Digital Subscriber Line, cable TV network, optical fiber, Bluetooth, Near Field Communication (NFC), Multimedia Messaging Service (MMS), Instant Message (IM), Infra- Red transmission, IEEE802.11, GSM, GPRS, Internet or 3G/4G mobile telecommunication, and it is not limited herein.

From the above, during the encoding, the electronic device obtains a 1D barcode. After that, the electronic device captures and compresses a horizontal image of the 1D barcode into a stego-data. In this manner, the image data of a 2D barcode will not be large and the 2D barcode can still be well recognized when using optical devices. In addition, many 1D barcode images can be carried into a 2D barcode by this manner, and more information can be provided after decoding the 2D barcode. Moreover, the image data of a 2D barcode is small so that one electronic device can quickly transmit the image data of the 2D barcode to another electronic device. Accordingly, there will no optical device be needed for adjusting the focus to capture the image of the 2D barcode, and the 2D barcode can still be decoded into the wanted 1D barcode images. Additionally, during encoding, the electronic device encodes the stego-data and the literal data, the numerical data and the combination thereof into a 2D barcode, and transmits the 2D barcode to another electronic device. When receiving the 2D barcode, the electronic device decodes this 2D barcode and generates a 1D barcode and the literal data, the numerical data and the combination thereof.

Figure 5:
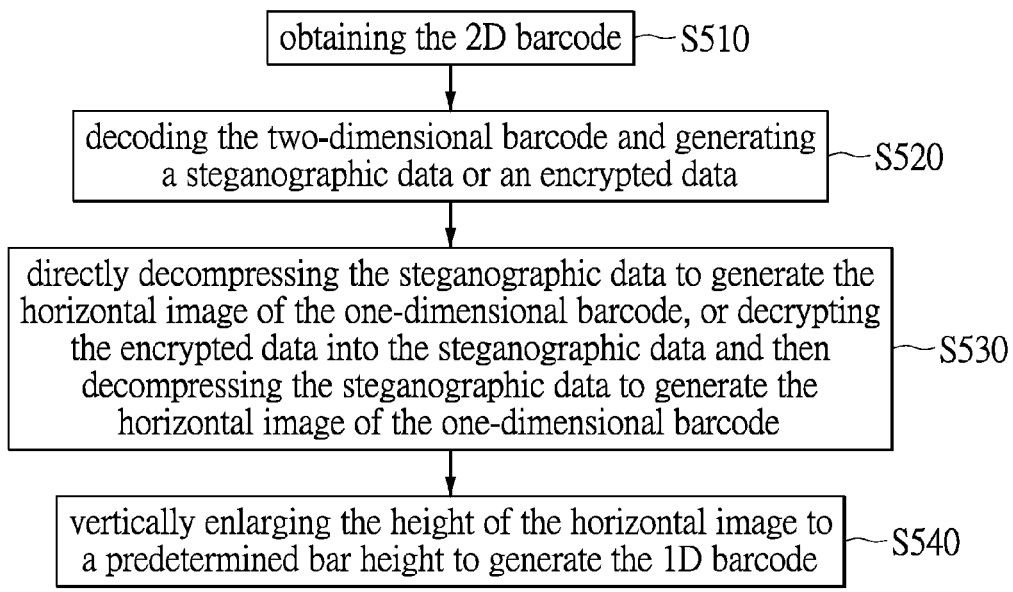
FIG. 5 shows a flow chart of a decoding method for 2D barcodes of one embodiment of the instant disclosure.

Referring to FIG. 5, FIG. 5 shows a flow chart of a decoding method for 2D barcodes of one embodiment of the instant disclosure. In this embodiment, the electronic device 50 will receive a 2D barcode d1 transmitted by the electronic device 100. First, in step S510, the electronic device 50 obtains the 2D barcode d1. Specifically speaking, the electronic device 50 can obtain the 2D barcode d1 from an external device, such as the electronic device 100, or obtain the 2D barcode d1 that has been previously stored.

In practice, the decoding for the 2D barcode d1 can be triggered by a user's gesture or a user's touch on a touch screen of the electronic device 50. Specifically speaking, the user can touch the 2D barcode d1 displayed on the touch screen of the electronic device 50 to drive the electronic device 50 to decode the 2D barcode d1, or the user can make a gesture within a sensing space of the electronic device 50 to drive the electronic device 50 to decode the 2D barcode d1. However, the electronic device 50 can be driven to decode the 2D barcode d1 in other ways.

After that, in step S520, the electronic device 50 decodes the 2D barcode d1 to generate a stego-data. Specifically speaking, the stego-data includes a horizontal image Im of a 1D barcode. The horizontal image Im is captured near a horizontal midline of the 1D barcode, and comprises part of each black bar Lb and part of each white bar Lw. Details about the stego-data have been described in the above embodiment. Moreover, if the stego-data includes a start flag and an end flag, has been encoded into a 2D barcode as the above embodiment by using a two-dimensional array and a 2D barcode encoding algorithm, in this step, the electronic device 50 uses the corresponding array and decoding algorithm to decode the 2D barcode to generate the stego-data according to the start flag and the end flag. In other embodiments, the electronic device 50 can use other corresponding data types and decoding algorithms to decode the 2D barcode to generate the stego-data.

If the stego-data and a plaintext data including a literal data, a numerical data or both have been encoded into the 2D barcode d1, then in step S520 the electronic device 50 can obtain the plaintext data and the stego-data after decoding the 2D barcode d1. Details about the encrypted data and the plaintext data have been described in the above embodiment.

Likewise, if the stego-data, the literal data of the plaintext data, and the numerical data of the plaintext data respectively includes a start flag and an end flag, has been encoded into a 2D barcode as the above embodiment, the electronic device 50 uses a corresponding array and decoding algorithm to decode the 2D barcode to generate the stego-data and the plaintext data according to the start and end flags. In other embodiments, the electronic device 50 can use other corresponding data types and decoding algorithms to decode the 2D barcode to generate the stego-data and the plaintext data.

If the stego-data were encrypted by using the RSA algorithm and at least one identifiable image, such as the identifiable images d2 and/or d3 shown in FIG. 4B, is composed upon the 2D barcode d1, the electronic device 50 can remove composed identifiable image before decoding the 2D barcode. In addition, after generating the encrypted data, the electronic device 50 decrypts the encrypted data by using the RSA algorithm. Details about how to remove the identifiable image from the 2D barcode d1 and details about how to decrypt the encrypted data by using the RSA algorithm are easily understood by the skilled in the art. In other embodiments, if the encrypted data were encrypted by other encryption algorithm, the electronic device 50 needs to remove the identifiable image from the 2D barcode d1 and then use a corresponding decryption algorithm to decrypt the encrypted data.

After decoding the 2D barcode to generate the encrypted data, in step S530, the electronic device 50 decrypts the encrypted data into the stego-data, and decompresses to generate a horizontal image Im of a 1D barcode. As mentioned, the horizontal image Im is compressed into a stego-data by using the run-length encoding (RLE). Thus, the electronic device 50 decompresses the stego-data by using the run-length decoding (RLD) to generate the horizontal image Im of the 1D barcode. Details about the run-length decoding are easily understood by those skilled in the art. In another embodiment, the horizontal image Im is compressed into an stego-data by using other compressing methods, and the electronic device 50 needs to uses a corresponding decompressing method to decompress the stego-data.

Figure 6A:
FIG. 6A shows a schematic diagram of a horizontal image of a 1D barcode in one embodiment of the instant disclosure.
Figure 6B:
FIG. 6B shows a schematic diagram showing that the height of the horizontal image shown in FIG. 6A is vertically enlarged to generate the 1D barcode.

After generating the uncompressed horizontal image Im of a 1D barcode, in step S540, the electronic device 50 vertically enlarges the height of the uncompressed horizontal image Im to a predetermined bar height to generate the 1D barcode. As shown in FIG. 6A and FIG. 6B, a 1D barcode Im1 is obtained by vertically enlarging the height of the horizontal image Im to a predetermined bar height VH. The horizontal image Im shows the width relationship of the black bars and white bars, which is referred to as the feature of the 1D barcode, and thus the obtained 1D barcode Im1 can also show width relationship of the black bars and white bars. A barcode reader can read the information of the 1D barcode Im1 according to the width relationship of the black bars and white bars.

In another case, after decoding the 2D barcode, the electronic device 50 can obtain the 1D barcode Im1 and the literal data, the numerical data or both of them. A user can easily know what this 1D barcode Im1 is used for according to the literal data, the numerical data or both, and can further obtain the information from this 1D barcode Im1.

Figure 7A:
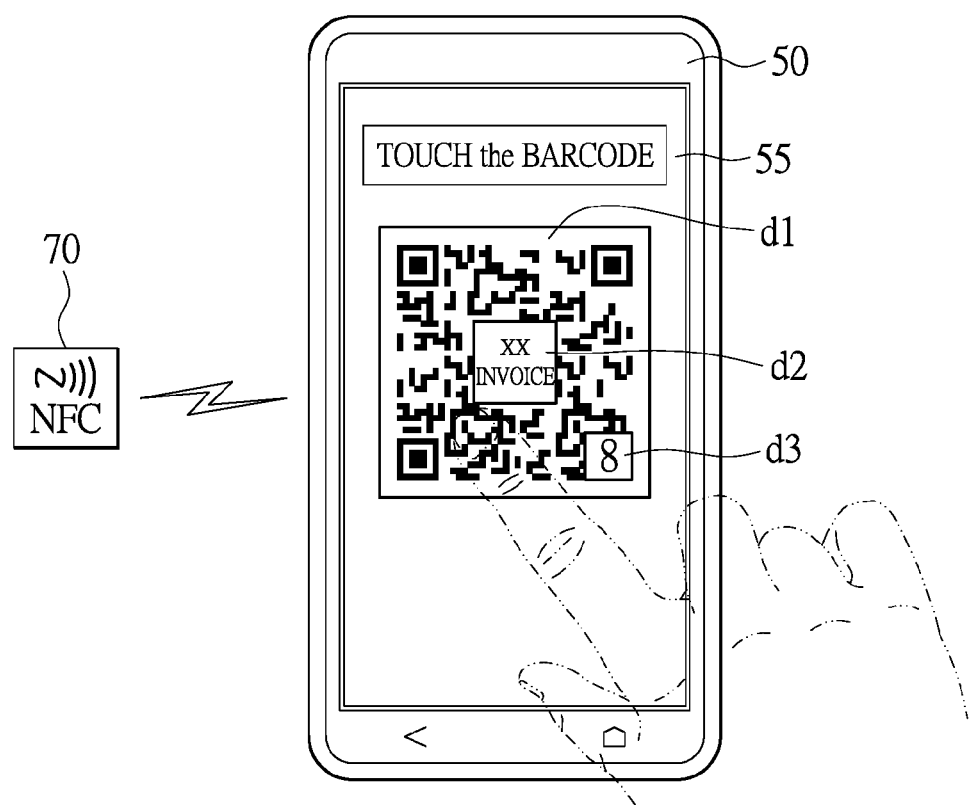
FIG. 7A shows a schematic diagram showing that a 2D barcode having the invoice information is transmitted to an electronic device through the NFC in one embodiment of the instant disclosure.

Take a 2D barcode of an invoice for example. As shown in FIG. 4B, a 2D barcode d1 with identifiable images d2 and d3 composed thereon is stored in a NFC device 70, wherein the 2D barcode d1 with the identifiable images d2 and d3 composed thereon is generated by encoding the feature of a 1D barcode, a literal data "August" and a numerical data "12345678". When a consumer takes his electronic device 50 near the NFC device 70, the electronic device 50 can receive the 2D barcode d1 transmitted from the NFC device 70 and the 2D barcode d1 is displayed on the screen of the electronic device 50. The consumer can then drive the electronic device 50 to decode the 2D barcode d1 to obtain detailed information of the invoice as shown in FIG. 7A.

After the electronic device 50 decodes the 2D barcode d1, a 1D barcode Im1, the literal data "August" and the numerical data "12345678" are displayed on the touch screen 55 of the electronic device 50. In other words, the invoice can be not in a paper form but a digital form, and the consumer can use the 2D barcode d1 shown on his electronic device 50 to request further services, such as obtaining a bonus. In this embodiment, the device 70 can be a device having a telecommunication module or a network communication module, such as a smart phone, a tablet, a wearable device, a POS machine, a KIOSK machine or the like, and it is not limited herein.

Figure 7B:
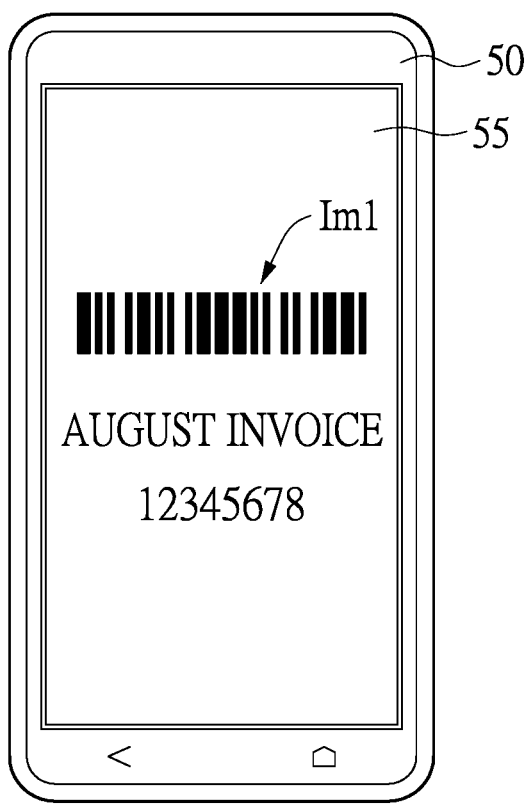
FIG. 7B shows a schematic diagram showing the 1D barcode, the literal data and the numerical data obtained by decoding the 2D barcode having the invoice information in FIG. 7A.
Figure 8:
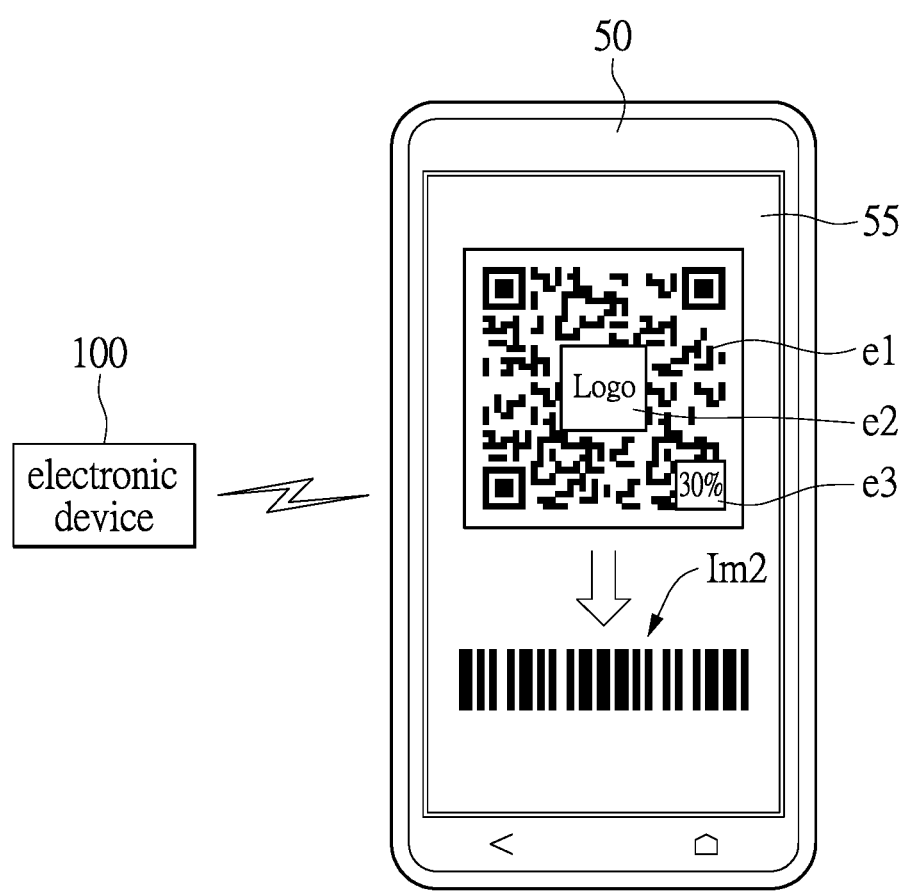
FIG. 8 shows a schematic diagram showing that a 2D barcode having the coupon information is transmitted to an electronic device through another electronic device in one embodiment of the instant disclosure.

In another embodiment, a retailer can use the electronic device 100 to transmit a 2D barcode e1 of a coupon to a consumer's electronic device 50 by messaging, as shown in FIG. 8. The 2D barcode e1 has identifiable images e2 and e3 composed thereon, and they will be all displayed on the touch screen 55 of the electronic device 50. The consumer can drive the electronic device 50 to decode the 2D barcode e1, for example, by touching the 2D barcode e1 on touch screen 55. Accordingly, the electronic device 50 decodes the 2D barcode e1 having identifiable images e2 and e3 composed thereon, generates and displays a 1D barcode and the literal data, the numerical data or both on the touch screen 55, as shown in FIG. 7B. Details relevant to the method for decoding 2D barcodes have been well illustrated in the above embodiments, and thus the repeated description is omitted herein.

The user can easily know what this 1D barcode Im2 can be used for according to the literal data, the numerical data or both, and thus can take his electronic device 50 to a store to use this 1D barcode, which is a coupon as mentioned. It is worth mentioning that, the 1D barcode used to generate a 2D barcode can also be a 1D barcode of a ticket, a pass, a receipt or the like, and it is not limited herein.

Figure 9A:
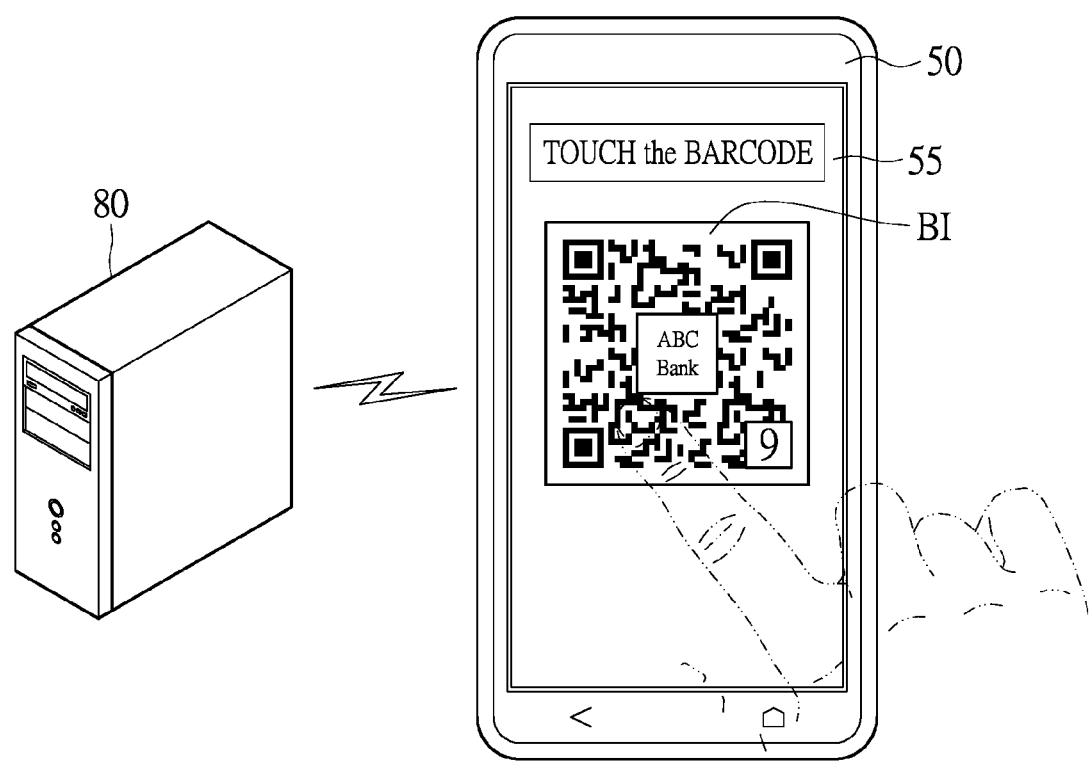
FIG. 9A shows a schematic diagram of a 2D barcode having the bill payment information of one embodiment of the instant disclosure.
Figure 9B:
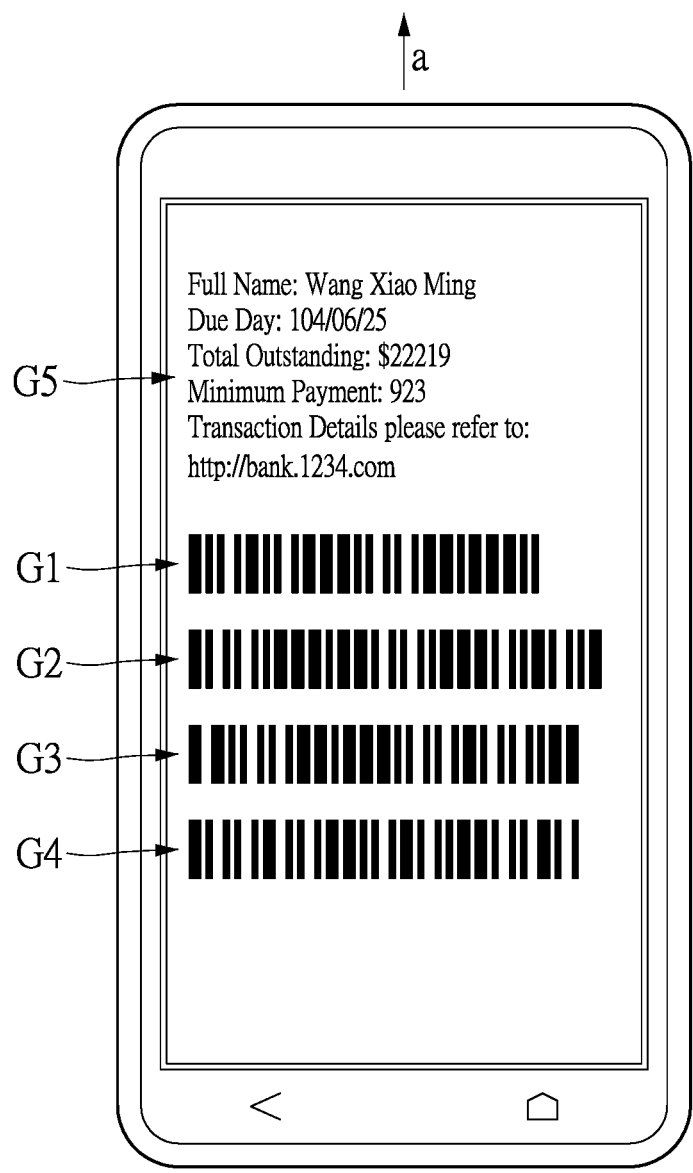
FIG. 9B shows a portrait orientation schematic diagram showing the 1D barcodes, the literal data and the numerical data obtained by decoding the 2D barcode having the bill payment information in FIG. 9A.

In another embodiment, the 1D barcode used to generate a 2D barcode can also be a 1D barcode of a bill payment. As shown in FIG. 9A and FIG. 9B, a 2D barcode BI of a bank-bill payment can be decoded into features of four 1D barcodes, the literal data and the numerical data, wherein the features of four 1D barcodes respectively indicate the payment receiver, the payment receiving account, the total payment amount and the minimum payment amount, and the literal data and the numerical data relates to the contents of the bill. When receiving this 2D barcode BI sent by a server 80, the electronic device 50 displays the 2D barcode BI on its touch screen 55.

The user can drive the electronic device 50 to decode the 2D barcode BI, for example, by touching the 2D barcode on the touch screen 55. After decoding, four 1D barcodes G1~G4 are displayed on the touch screen 55, which respectively indicate the payment receiver, the payment receiving account, the total payment amount and the minimum payment amount. Moreover, the literal data and the numerical data G5 is also displayed on touch screen 55.

Figure 9C:
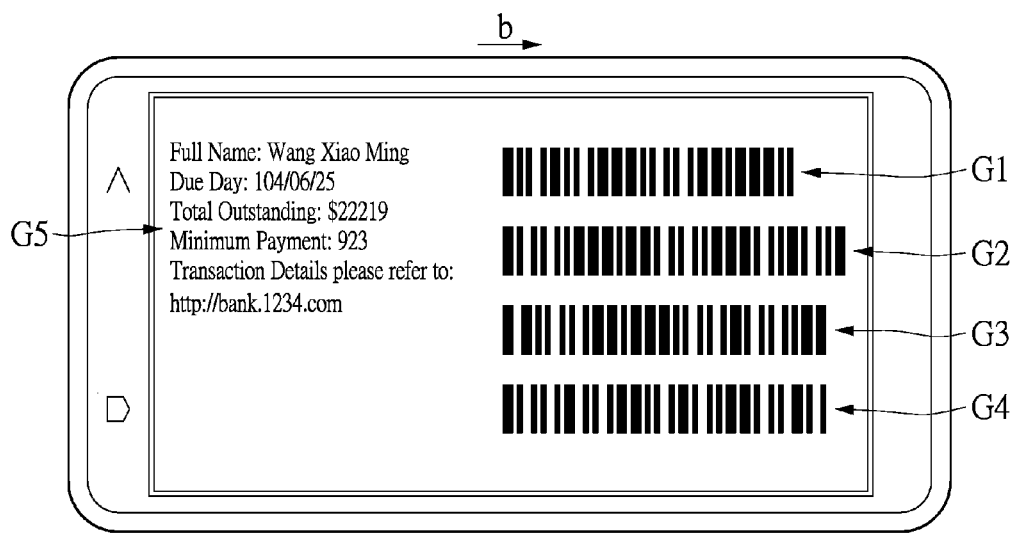
FIG. 9C shows a landscape orientation schematic diagram showing the 1D barcodes, the literal data and the numerical data obtained by decoding the 2D barcode having the bill payment information in FIG. 9A.

Referring to FIG. 9B and FIG. 9C, FIG. 9B and FIG. 9C shows schematic diagrams showing the 1D barcodes, the literal data and the numerical data obtained by decoding the 2D barcode having the bank bill information in FIG. 9A. In prior art, a 1D barcode, displayed on an electronic device every time, must be generated by encoding raw data and must base on the 1D barcode encoding rules. Relatively, in this embodiment, these four 1D barcodes G1~G4, generated by decoding a 2D barcode and displayed on an electronic device 50, are completely restituted of original 1D barcode images. Thus, in this embodiment, if a user rotates the electronic device 50 from the direction a (portrait orientation) to the direction b (landscape orientation), this rotation is just an image rotation for the electronic device 50. In other words, the electronic device 50 does not need to encode raw data based on the 1D barcode encoding rules again and again to generate these four 1D barcodes G1~G4. Moreover, the user can easily know the contents of the bill payments (that is the 2D barcode image BI) according to the literal data and the numerical data G5, and can take his electronic device 50 to a place wherein there is a 1D barcode reader (e.g. a convenience store, a post office or a bank), and to pay the bill payments on demand by using a reader to read the required 1D barcodes from G1~G4.

To sum up, by using the encoding method and the decoding method for 2D barcodes, and the electronic device executing these methods provided by the instant disclosure, at least one feature of a 1D barcode, such as a horizontal image of the 1D barcode, can be compressed and/or encrypted and encoded into a 2D barcode. In addition, the feature of the 1D barcode, and a literal data, a numerical data or both can be encoded into a 2D barcode. In this manner, the image data of the 2D barcode will not be increased too greatly and the 2D barcode can encode more data types, and the 2D barcode can still be well recognized when using optical devices. In addition, many 1D barcode images can be carried into a 2D barcode by this manner, and more information can be provided after decoding the 2D barcode. Accordingly, there will no optical device be needed for adjusting the focus to capture the image of the 2D barcode, and the 2D barcode can still be decoded into the wanted 1D barcode images. Moreover, the image data of the 2D barcode is small, so the 2D barcode can still be transmitted from one electronic device to another electronic device quickly. When receiving the 2D barcode, the electronic device can decode this 2D barcode into at least one 1D barcode, and a literal data, a numerical data or both.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An encoding method for two-dimensional barcodes, used in an electronic device to encode a feature of a one-dimensional barcode into the two-dimensional barcode, wherein the one-dimensional barcode comprises a plurality of parallel black bars and white bars, the encoding method comprising:
obtaining the one-dimensional barcode;
capturing a horizontal image of the one-dimensional barcode near a horizontal midline of the one-dimensional barcode, wherein the horizontal image refers as the feature of the one-dimensional barcode, and the horizontal image comprises part of each black bar and part of each white bar;

compressing the horizontal image to generate a steganographic data; and encoding the steganographic data into the two-dimensional barcode.

2. The encoding method according to claim 1, wherein the steps of compressing the horizontal image to generate the steganographic data and encoding the steganographic data into the two-dimensional barcode comprise:

compressing the horizontal image to generate the steganographic data;

encrypting the steganographic data to generate an encrypted data; and encoding the encrypted data into the two-dimensional barcode.

3. The encoding method according to claim 2, wherein the step of encrypting the steganographic data to generate the encrypted data comprises:

using an encryption algorithm to encrypt the steganographic data.

4. The encoding method according to claim 1, wherein the steganographic data comprises a start flag and an end flag, the step of encoding the steganographic data into the two-dimensional barcode further comprises:

using a data type and an encoding algorithm to encode the steganographic data into the two-dimensional barcode according to the start flag and the end flag of the steganographic data.

5. The encoding method according to claim 1, wherein after the step of encoding the steganographic data into the two-dimensional barcode, the encoding method comprises:

composing at least one identifiable image at one position of the two-dimensional barcode, and the size of the identifiable image is smaller than a predetermined percentage of the two-dimensional barcode.

6. The encoding method according to claim 1, wherein after the step of encoding the steganographic data into the two-dimensional barcode, the encoding method comprises:

transmitting the two-dimensional barcode to another electronic device through one of communication technologies including Asymmetric Digital Subscriber Line, cable TV network, optical fiber, Bluetooth® communication, Near Field Communication, Multimedia Messaging Service, Instant Message, Infra-Red transmission, IEEE802.11, GSM, GPRS, Internet or 3G/4G mobile telecommunication.

7. The encoding method according to claim 1, further comprising:

obtaining a literal data, a numerical data or a combination thereof and accordingly generating a plaintext data, and encoding the steganographic data and the plaintext data into the two-dimensional barcode.

8. The encoding method according to claim 7, wherein the steganographic data comprises a start flag and an end flag, the literal data comprises a start flag and an end flag, the numerical data comprises a start flag and an end flag, and the step of encoding the steganographic data and the plaintext data into the two-dimensional barcode further comprises:

using a data type and an encoding algorithm to encode the steganographic data and the plaintext data into the two-dimensional barcode according to the start flag and the end flag of the steganographic data, the start flag and the end flag of the literal data, and the start flag and the end flag of the numerical data.

9. The encoding method according to claim 7, wherein after the step of encoding the steganographic data and the plaintext data into the two-dimensional barcode, the encoding method comprises:

composing at least one identifiable image at one position of the two-dimensional barcode, and the size of the identifiable image is smaller than a predetermined percentage of the two-dimensional barcode.

10. An electronic device, used to encode a feature of a one-dimensional barcode into a two-dimensional barcode, wherein the one-dimensional barcode comprises a plurality of parallel black bars and white bars, the electronic device comprising:

a storage unit; and an operation processing unit, electrically connected to the storage unit to execute steps:

obtaining the one-dimensional barcode;

capturing a horizontal image of the one-dimensional barcode near a horizontal midline of the one-dimensional barcode, wherein the horizontal image refers as the feature of the one-dimensional barcode, and the horizontal image comprises part of each black bar and part of each white bar;

compressing the horizontal image to generate a steganographic data;

encoding the steganographic data into the two-dimensional barcode; and storing the two-dimensional barcode in the storage unit.

11. The electronic device according to claim 10, wherein the steps of compressing the horizontal image to generate the steganographic data and encoding the steganographic data into the two-dimensional barcode comprise:

compressing the horizontal image to generate the steganographic data;

encrypting the steganographic data to generate an encrypted data; and encoding the encrypted data into the two-dimensional barcode.

12. The electronic device according to claim 10, wherein the operation processing unit obtains a literal data, a numerical data or a combination thereof and accordingly generates a plaintext data, encodes the steganographic data and the plaintext data into the two-dimensional barcode.

13. A decoding method for two-dimensional barcodes, used in an electronic device to obtain a feature of a one-dimensional barcode from the two-dimensional barcode, wherein the one-dimensional barcode comprises a plurality of parallel black bars and white bars, the decoding method comprising:

obtaining the two-dimensional barcode;

decoding the two-dimensional barcode and generating a steganographic data, wherein the steganographic data comprises a horizontal image of the one-dimensional barcode, the horizontal image is captured near a horizontal midline of the one-dimensional barcode, and the horizontal image comprises part of each black bar and part of each white bar;

decompressing the steganographic data to generate the horizontal image of the one-dimensional barcode; and vertically enlarging the height of the horizontal image to a predetermined bar height and generating the one-dimensional barcode.

14. The decoding method according to claim 13, wherein before the step of decoding the two-dimensional barcode, the decoding method further comprises:

using a gesture control or touching a position at the two-dimensional barcode displayed on a touch screen of the electronic device to start the decoding for the two-dimensional barcode.

15. The decoding method according to claim 13, wherein if after decoding the two-dimensional barcode an encrypted data is generated, the decoding method further comprises:
using a decryption algorithm to decrypt the encrypted data into the steganographic data, wherein the decryption algorithm corresponds to an encryption algorithm previously used for generating the encrypted data; and
decompressing the steganographic data to generate the horizontal image of the one-dimensional barcode.

16. The decoding method according to claim 13, wherein the steganographic data comprises a start flag and an end flag, and the step of decoding the two-dimensional barcode further comprises:
using a data type and a decoding algorithm to decode the two-dimensional barcode into the steganographic data according to the start flag and the end flag.

17. The decoding method according to claim 13, wherein at least one identifiable image is composed in the two-dimensional barcode, the size of the identifiable image is smaller than a predetermined percentage of the two-dimensional barcode, and before the step of decoding the two-dimensional barcode, the decoding method further comprises:
removing the identifiable image that is composed in the two-dimensional barcode.

18. The decoding method according to claim 13, wherein the step of decoding the two-dimensional barcode further comprises:
generating a plaintext data, wherein the plaintext data comprises a literal data, a numerical data or a combination thereof.

19. The decoding method according to claim 13, wherein the steganographic data comprises a start flag and an end flag, the literal data comprises a start flag and an end flag, the numerical data comprises a start flag and an end flag, and the step of decoding the two-dimensional barcode further comprises:
using a data type and a decoding algorithm to decode the two-dimensional barcode into the steganographic data and the plaintext data according to the start flag and the end flag of the steganographic data, the start flag and the end flag of the literal data, and the start flag and the end flag of the numerical data.

* * * * *